(12) United States Patent
Martynov et al.

(10) Patent No.: US 10,037,822 B2
(45) Date of Patent: Jul. 31, 2018

(54) METHOD FOR THE IN SITU PASSIVATION OF THE STEEL SURFACES OF A NUCLEAR REACTOR

(71) Applicant: Joint Stock Company "AKME-Engineering", Moscow (RU)

(72) Inventors: Petr Nikiforovich Martynov, Obninsk (RU); Radomir Shamilievich Askhadullin, Obninsk (RU); Konstantin Dmitrievich Ivanov, Obninsk (RU); Aleksandr Urievich Legkikh, Obninsk (RU); Aleksey Nikolaevich Storozhenko, Obninsk (RU); Aleksandr Ivanovich Filin, Moscow (RU); Sergey Viktorovich Bulavkin, Moscow (RU); Said Mirfaisovich Sharikpulov, Barvikha (RU); Stepan Artemovich Borovitsky, Moscow (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 310 days.

(21) Appl. No.: 15/022,834

(22) PCT Filed: Mar. 19, 2014

(86) PCT No.: PCT/RU2014/000171
§ 371 (c)(1),
(2) Date: Mar. 17, 2016

(87) PCT Pub. No.: WO2015/047131
PCT Pub. Date: Apr. 2, 2015

(65) Prior Publication Data
US 2016/0232990 A1 Aug. 11, 2016

(30) Foreign Application Priority Data
Sep. 30, 2013 (RU) .............................. 2013143712

(51) Int. Cl.
| | |
|---|---|
| *G21C 1/03* | (2006.01) |
| *G21C 13/08* | (2006.01) |
| *G21C 21/00* | (2006.01) |
| *C23C 22/72* | (2006.01) |
| *C23C 22/73* | (2006.01) |
| *G21C 15/247* | (2006.01) |
| *G21C 17/022* | (2006.01) |

(52) U.S. Cl.
CPC ............... *G21C 1/03* (2013.01); *C23C 22/72* (2013.01); *C23C 22/73* (2013.01); *G21C 13/08* (2013.01); *G21C 15/247* (2013.01); *G21C 17/0225* (2013.01); *G21C 21/00* (2013.01); *G21Y 2002/101* (2013.01); *G21Y 2004/20* (2013.01); *Y02E 30/40* (2013.01)

(58) Field of Classification Search
None
See application file for complete search history.

(56) References Cited

U.S. PATENT DOCUMENTS

| | | | | |
|---|---|---|---|---|
| 5,108,697 | A * | 4/1992 | Esposito | ................ G21C 19/28 376/305 |
| 2009/0252883 | A1 | 10/2009 | Kim et al. | |
| 2012/0230459 | A1 | 9/2012 | Elshaik | |
| 2014/0211903 | A1 * | 7/2014 | Gregorich | .............. G21C 15/28 376/306 |

FOREIGN PATENT DOCUMENTS

| | | |
|---|---|---|
| RU | 2190699 | 10/2002 |
| RU | 2232937 | 7/2004 |
| RU | 2303745 | 7/2007 |
| RU | 2456686 | 7/2012 |

OTHER PUBLICATIONS

Machine Translation of RU 2456686 C1 (Year: 2018).*
International Preliminary Report on Patentability dated Apr. 5, 2016.
Translation of Written Opinion of the International Searching Authority dated Jun. 19, 2014.
Written Opinion of the International Searching Authority dated Jun. 19, 2014.
Translation of International Search Report dated Jun. 19, 2014.
International Search Report dated Jun. 19, 2014.

* cited by examiner

*Primary Examiner* — Shamim Ahmed
*Assistant Examiner* — Bradford M Gates
(74) *Attorney, Agent, or Firm* — Preston Smirman; Smirman IP Law, PLLC

(57) ABSTRACT

The invention relates to the field of nuclear technology, and specifically to a method for the in situ passivation of steel surfaces. The method consists in installing, in a position intended for a regular core, a core simulator in the form of a model of the core, which models the shape thereof, the relative position of the core components, and also the mass characteristics thereof; next, the reactor is filled with a heavy liquid metal heat transfer medium, the heat transfer medium is heated to a temperature which provides for the conditions of passivation, and in situ passivation is carried out in two stages, the first of which includes an isothermal passivation mode in conformity with the conditions determined for this stage, and the second mode includes non-isothermal passivation, which is carried out under different conditions, after which the core simulator is removed and the regular core is installed in the place thereof. The method provides for the corrosion-resistance of steel elements in a heavy liquid metal heat transfer medium environment and permits a decrease in the maximum rate of oxygen consumption during the initial period of operation of a nuclear actor.

12 Claims, No Drawings

METHOD FOR THE IN SITU PASSIVATION OF THE STEEL SURFACES OF A NUCLEAR REACTOR

CROSS-REFERENCE TO RELATED APPLICATION

The instant application is a national phase of PCT International Application No. PCT/RU2014/000171 filed Mar. 19, 2014, and claims priority to Russian Patent Application Serial No. 2013143712, filed Sep. 30, 2013, the entire specifications of both of which are expressly incorporated herein by reference.

FIELD OF THE INVENTION

The invention relates to the field of nuclear technology, and specifically to a method for the in situ passivation of steel surfaces of a nuclear reactor with a heavy liquid metal coolant.

PRIOR ART

Various methods for surface passivation of steel pipes are known.

For example, the prior art discloses a method for passivation of surfaces of boiler pipes and the power unit, wherein the passivation is carried out with a gaseous oxidizer (oxygen) fed into the medium during boiler run-up with the turbine off while monitoring the outflow of iron oxides. From the very beginning of the boiler run-up, the medium is continuously transferred into the steam-water mixture state by decreasing the medium pressure and temperature. Heat release in the boiler furnace is increased stepwise with shifting to a new stage of heat release after the iron oxides cease to outflow at this step of cleaning. The initial pressure level in the superheater zone of the boiler for oxidizer supply is from 1.0 to 1.2 MPa, and after the superheater zone pressure of 2.0-3.0 MPa is reached and iron oxides cease to outflow at the stage, the pressure and temperature of the boiler medium are increased to the values sufficient for recovery of the medium in the boiler superheater zone from the steam-water mixture state, and such conditions are maintained until the passivation process is completed (Russian Patent RU 2232937, F22B37/48, Jul. 20, 2004).

A method of passivation of steel pipes by their treatment with an oxygen-containing agent is known, according to the invention, air with addition of oxygen or nitrogen to a concentration of maximum 1.2 g/l is used as the oxygen-containing agent, and the processing is performed for 0.5-50.0 minutes at an agent flow rate of 50-200 m/s and 300-500° C. (Russian Patent RU 2190699, C23G5/00, Oct. 10, 2002). The method is intended for corrosion protection of steel pipes of various diameters and lengths that require effective protection against corrosion, in particular, protection of their inner surface that is not easily accessible. The method is intended for enterprises manufacturing steel pipes for the industry.

Another method of oxygen cleaning and passivation of internal surfaces of boiler pipes with a cleaning agent comprising a mixture of oxygen and feedwater or steam, or a water-steam mixture is known, wherein the oxygen concentration in the cleaning agent is maintained within the range of 10-15 g/kg, and the cleaning is performed for 4.5-5.5 hours at the cleaning agent temperature of 90-450° C. (Russian Patent RU 2303745, F22B37/48, Jul. 27, 2007).

As stated in the description of the invention, the method ensures effective cleaning and passivation of the inner surface of pipes while reducing power consumption and power equipment downtime.

At the same time, the purpose of this method is the passivation of internal surfaces of pipes by running a mixture of oxygen and feed water, steam, or a water-steam mixture through the pipes. This method is not suitable for passivation of steel elements of a nuclear plant, as the operating conditions, including temperature conditions, and materials used in structures of such devices are essentially different. In addition, requirements for reliable operation of nuclear reactors are significantly higher than those for boiler equipment.

In particular, the following technologies are typically used to ensure corrosion resistance of the primary circuit structural steels for nuclear reactors with a heavy liquid metal coolant:

chemical or electrochemical preparation of the fuel element (FE) surface;

off-circuit (factory) passivation (pre-oxidation) of individual components and assemblies in oxidizing media such as an alloy for core elements, carbon dioxide for steam generators, water vapor for control and protection system (CPS) casings;

rejection of FEs with steel claddings based on results of thickness and quality monitoring of the oxide layer generated on the FE surface.

These operations are generally performed at the plant manufacturing primary circuit elements of the nuclear reactor.

Pretreatment and passivation of major surfaces of the primary circuit, as described in the above analogue RU2190699, can significantly reduce the integral dissolved oxygen consumption by steel and thus simplify operation of mass transfer units or other tools maintaining the oxygen potential of the coolant materially, especially at the initial stage of nuclear reactor operation.

However, during the off-circuit (factory) passivation, major technical shortcomings were detected, mostly in relation to the conditions of preliminary off-circuit oxidation of FEs with EI steel claddings in open baths such by means of lead-bismuth type eutectics. Off-circuit passivation (oxidation) of products in gaseous media ($CO_2$, water vapor) complicated the factory technologies. At the same time, it should be noted that rejection of finished products was implemented at the factory passivation stage that proved to be rather effective according to the plant operation results. In the course of the two stages of rejection (after preliminary steel preparation and factory passivation), the rejection rate amounted to ~10% or more. For off-circuit passivation of steam generators made of pearlite steels, special conditions of treatment in carbon dioxide at higher temperatures were implemented in combination with welded joint annealing processes.

It should be noted that the selection of the temperature and oxygen conditions for factory passivation is not optimal, since oxide films with plumboferrite phases without protective properties appear on the steel surface during such treatment.

As evidenced by practice, pretreatment of steel surfaces of the primary circuit of a fast nuclear reactor with a heavy liquid metal coolant cannot guarantee a sufficient level of passivation minimizing oxidation processes on the surfaces in case of interaction of the surfaces of the primary circuit with the liquid metal coolant (for example, lead, lead-bismuth eutectic) for the above reasons.

In view of the above, in addition to the factory (off-circuit) passivation, provision is usually made for in situ passivation of steel surfaces performed during initial operation of nuclear reactors for fast nuclear reactors.

A technical solution relating to the in situ passivation of structures of fast power reactors equipped with means of corrosion protection of fuel elements and primary circuit elements contacting a liquid metal (lead) coolant is selected as the closest analog of the invention (Russian Patent RU2456686, G21C1/03, Jul. 20, 2012).

As stated in RU2456686, when using a lead coolant, problems associated with corrosion of structural elements of the reactor primary circuit occur. The invention according to RU2456686 is aimed at suppression of corrosion of structural elements of the primary heat circuit, primarily of structural elements installed in the nuclear reactor core, due to formation of stable passive carbide films. In addition, the invention ensures protection against mechanical damage of corrosion-resistant FE claddings and protective coatings generated on the primary circuit structural elements. The solution to these tasks is based on the fact that FE housing claddings under difficult operation conditions, namely in the hot spot area in contact with a lead coolant in the high-temperature end of the reactor primary circuit are most exposed to corrosion. The so-called dynamic corrosion arising and developing as a result of coolant circulation between primary circuit parts with different temperatures is of special importance. To ensure corrosion protection of FE claddings and elements of the primary circuit of a fast nuclear reactor with a liquid metal (lead) coolant, a passivation additive, namely carbon, is fed into the coolant. For FE cladding made of vanadium or niobium (or an alloy of both), the liquid metal coolant (carbon-lead alloy) comes in contact with the FE protective housing cladding material, which leads to cementation of the cladding surface layer. A passive carbide coating is formed on the protective cladding surface as the result.

This method is limited in application as it involves the use of FEs comprising not only a leak-tight housing, but also a protective cladding made of vanadium or niobium or an alloy based on vanadium and/or niobium, and lead is used as a coolant. The closest analog is aimed at creation of a carbide film, mainly on the FE protective cladding surface, wherein passivation of the other elements of the nuclear reactor primary circuit (pumps, steam generators surfaces, etc.) appears less intensive (the description does not specify if the material of such elements contains vanadium, niobium or an alloy based on the same).

INVENTION DISCLOSURE

The purpose of the invention is reliable in situ passivation of steel surfaces of the primary circuit elements of a nuclear reactor with a heavy liquid metal coolant by means of creation of conditions for oxidation process development to ensure the required level of passivation at the initial stage of nuclear reactor operation.

Considering the existing physical limitations of the known means in terms of possible intensity of oxygen introduction into the coolant, a situation may occur when the oxygen consumption due to oxidation reactions will exceed the rate of its introduction into a heavy liquid metal coolant, which means that maintaining the required oxygen conditions for the said coolant is impossible. The initial stage of nuclear reactor operation is the most problematic in this respect. The situation is further complicated by the fact that the initial stage of oxide film formation on steel products immersed in a heavy liquid metal coolant cannot be calculated correctly at the moment. Therefore, material errors occur during estimation of initial rates of steel oxidation making it difficult to compare with the capabilities of the heavy liquid metal coolant technology.

A solution to these tasks allows to maintain a passivating film on the surfaces of steel elements during further operation of a nuclear reactor exclusively by standard means of mass transfer used in the nuclear reactor.

The process of in situ passivation with a core simulator provides the following technical results:
  corrosion resistance of steel specimens not subjected to any special pretreatment for operation in a heavy liquid metal coolant;
  reduced maximum oxygen consumption rates that decrease as the primary circuit surfaces are oxidized at the initial stage of nuclear reactor operation;
  reduced dissolved oxygen performance of the process means of oxygen introduction into the coolant that maintain the required oxygen conditions at the initial stage of nuclear reactor operation.

Given the fact that FEs can be pre-passivated, oxygen consumption for their oxidation can be further reduced significantly.

These technical results are influenced by the following essential features of the nuclear reactor steel surface in situ passivation method.

A method for the in situ passivation of the steel surfaces of a nuclear reactor consisting in that a protective film is formed on the surface of the nuclear reactor primary circuit elements by introduction a substance interacting with the material of the primary circuit elements into the coolant, thus forming a protective film, wherein, during installation of the nuclear reactor prior to its filling with the reactor coolant, a core simulator is installed in the place of the core, the reactor is filled with a coolant that is heated to temperatures ensuring passivation conditions and then the core simulator is removed and replaced with the standard core.

A liquid metal coolant is used as the primary circuit coolant.

The in situ passivation is carried out in two stages, wherein the first stage is carried out under isothermal passivation conditions where oxygen is introduced into the liquid metal coolant, and the second stage is conducted under non-isothermal passivation conditions.

The isothermal passivation is carried out at T=300° C.-330° C.

Oxygen with a thermodynamic activity of $a=10^{-1} \div 10^{-3}$ is introduced into the liquid metal coolant.

Oxygen thermodynamic activity $a=10^{-1} \div 10^{-3}$ and temperature T=300° C.-330° C. are maintained for t=220 (±20) hours.

The non-isothermal passivation is performed with a pump or pumps on.

The power of the pump or pumps amounts to at least 30 percent of the rated value.

The oxygen concentration is maintained at $C_{O_2}=(1-4)*10^{-6}$ wt %.

Oxygen thermodynamic activity a is increased to $a=10^{-2} \div 10^{-4}$.

The power of the pump or pumps of at least 30 percent of the rated value, oxygen concentration $C_{O_2}=(1-4)*10^{-6}$ wt % and oxygen thermodynamic activity $a=10^{-2} \div 10^{-4}$ are maintained for t=550 (±50) hours.

The core simulator is a core model simulating its shape, relative position of the core elements, as well as their masses and dimensions.

As in the prior art (RU 2456686), a protective film is formed on the surface of the elements of the reactor primary circuit for in situ passivation of steel surfaces of the fast nuclear reactor primary circuit by introduction of a substance interacting with the primary circuit element material into the nuclear reactor primary circuit heavy liquid coolant to form a protective film.

The distinction of the claimed method is that a core simulator (CS), a core model simulating its shape, relative position of the core elements (including fuel assemblies), as well as their masses and dimensions, is installed in the standard core place during nuclear reactor installation prior to its filling with a liquid reactor coolant.

Then the reactor is filled with a heavy liquid metal coolant, the coolant is heated to temperatures ensuring the passivation conditions.

The in situ passivation is carried out in two stages, the first one including isothermal passivation at T=300-330° C. with pumps off and high oxygen thermodynamic activity $a=10^{-1} \div 10^{-3}$, where the said temperature and oxygen activity are maintained for t=220±20 hours, and the second stage involves non-isothermal passivation with the pumps on at the power level of at least 30% of the rated value for t=550±50 hours, wherein the oxygen concentration is maintained at the level of $Co_2=(1-4)*10^{-6}$ wt % with high oxygen thermodynamic activity $a=10^{-2} \div 10^{-4}$, then the core simulator is removed and replaced with the standard core, wherein the coolant temperature increases from T=300-330° C. to the level required for passivation (T=410-420° C.).

Then the achieved oxygen concentration is maintained in the liquid metal coolant during normal operation.

Application of a full-scale CS in the hot trial mode to simulate the flow around all elements of the primary circuit of a nuclear reactor allows to improve corrosion resistance of structural steel in the primary circuit with a heavy liquid metal coolant by steel oxidation in the heavy liquid metal coolant medium and reduce the required oxygen concentration for normal operation under oxygen concentration conditions of at least $(CO2=(1-10)*10^{-6}$ wt %).

Preliminary (off-circuit, for instance, factory) passivation of such primary circuit elements as the core and steam generators allows to reduce the intensity of oxygen consumption by about 50% during normal operation, wherein passivation of steam generators yields the maximum effect (~30%) due to the fact they have a large surface area in contact with the liquid metal coolant. A significant advantage of the claimed method is that thin continuous and durable (corrosion) protection oxide films are formed when the above conditions are met. Studies have shown that to reduce the intensity of oxidizing interaction of steel with the coolant under normal (operating) conditions effectively, film thickness of approx. 1-2 μm is sufficient at the initial stage of nuclear reactor operation.

During application of the claimed method of damaging the oxide layer formed in the heavy liquid metal coolant flow in the course of bench corrosion tests of unpassivated steel specimens of the primary circuit at the selected oxygen concentration, no corrosion damage occurred during the tests, on the contrary, damages were remedied and an oxide layer of the required thickness, strength and continuity was formed.

To substantiate the claimed method of in situ passivation, a significant number of experiments were conducted. In particular, with regard to the essential components of the primary circuit, fuel elements (steel EP-823), it was demonstrated that preoxidation in the melt provides reliable corrosion protection of the whole steel surface at higher temperatures (t=620-650° C.) on the basis of 1000 to 5000 hours with good statistics (tens of campaigns). The latter circumstance is essential as pitting corrosion spots were detected from time to time with a statistical dispersion on witness specimens without protection of any kind, including preoxidation, during the very tests.

IMPLEMENTATION OF THE INVENTION

Based on the experimental data, the most suitable mode is the in situ passivation at 410-420° C. with high oxygen concentration ($Co_2 \sim 1*10^{-5}$ wt %), which allows to combine the passivation with duration between 2 and 4 weeks with other commissioning operations and does not lead to unnecessary delays in the reactor plant start-up.

Implementation of the steel surface in situ passivation with the heavy liquid metal coolant fast reactor core simulator is performed in separate stages and involves the following mandatory process operations:

installation of the CS in the regular place of the reactor plant core;
reactor filling with a heavy liquid metal cooled;
coolant heating up to the temperatures ensuring the passivation conditions;
in situ passivation, including isothermal passivation conditions (T=300-330° C., t~220 hours), and non-isothermal passivation conditions (at the pump power level of at least 30% of the rated value for t~550 hours) with high oxygen thermodynamic activity ($a=10^{-1} \div 10^{-3}$ for isothermal and $a=10^{-2} \div 10^{-4}$ for non-isothermal);
removal of the CS.

Then, after replacement of the CS with the standard core, during normal operation of the fast nuclear reactor, the necessary oxygen concentration is maintained continuously, which ensures continuous passivation of steel parts that goes on at normal coolant temperatures, but less intensively than during the implementation of the claimed method using the CS.

The invention claimed is:

1. A method for in situ passivation of steel surfaces of a nuclear reactor, comprising the steps of:
   forming a protective film on a surface of the nuclear reactor primary circuit elements by introduction of a substance interacting with a material of the primary circuit elements into a primary circuit coolant, thus forming the protective film;
   wherein, during installation of the nuclear reactor prior to its filling with a reactor coolant, a core simulator is installed in place of a core, the nuclear reactor is filled with a reactor coolant that is heated to temperatures ensuring passivation conditions and then the core simulator is removed and replaced with a standard core.

2. The method according to claim 1, wherein a liquid metal coolant is used as the primary circuit coolant.

3. The method according to claim 2, wherein the in situ passivation is carried out in two stages, wherein the first stage is carried out under isothermal passivation conditions where oxygen is introduced into the liquid metal coolant, and the second stage is conducted under non-isothermal passivation conditions.

4. The method according to claim 3, wherein the isothermal passivation is carried out at T=300° C.-330° C.

5. The method according to claim 4, wherein oxygen is introduced in the liquid metal coolant with a thermodynamic activity $a=10^{-1} \div 10^{-3}$.

6. The method according to claim 5, wherein the oxygen thermodynamic is maintained for t=220 (±20) hours.

7. The method according to claim 3, wherein the non-isothermal passivation is performed with at least one pump on.

8. The method according to claim 7, wherein a power of the pump amounts to at least 30 percent of a rated value.

9. The method according to claim 7, wherein an oxygen concentration is maintained at a level of $C_{O_2}=(1\text{-}4)*10^{-6}$ wt %.

10. The method according to claim 7, wherein the oxygen thermodynamic activity a is increased to $a=10^{-2} \div 10^{-4}$.

11. The method according to claim 7, wherein the power of the pump is at least 30 percent of the rated value, the oxygen concentration $C_{O_2}=(1\text{-}4)*10^{-6}$ wt % and the oxygen thermodynamic activity $a=10^{-2} \div 10^{-4}$ are maintained for $t=550\ (\pm 50)$ hours.

12. The method according to claim 1, wherein the core simulator is a core model simulating its shape, relative position of core elements, and their masses and dimensions.

\* \* \* \* \*